(12) United States Patent
Campbell et al.

(10) Patent No.: US 7,124,634 B2
(45) Date of Patent: Oct. 24, 2006

(54) SINGLE PLATE CAPACITIVE ACCELERATION DERIVATIVE DETECTOR

(75) Inventors: Ray F. Campbell, Newport Beach, CA (US); Joan D. Wada, Anaheim, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/604,537

(22) Filed: Jul. 29, 2003

(65) Prior Publication Data

US 2005/0022598 A1  Feb. 3, 2005

(51) Int. Cl.
G01P 15/125 (2006.01)
G01P 15/00 (2006.01)

(52) U.S. Cl. ..................... 73/514.32; 514/36
(58) Field of Classification Search ............. 73/514.32, 73/514.36, 504.15, 503; 324/661; 361/280; 438/379

See application file for complete search history.

(56) References Cited

U.S. PATENT DOCUMENTS

| | | | |
|---|---|---|---|
| 2,696,566 A | 12/1954 | Lion | 307/52 |
| 2,711,590 A | 6/1955 | Wilcox | 33/366.19 |
| 3,186,101 A | 6/1965 | Wolpert | 33/366.22 |
| 3,226,981 A | 1/1966 | Mullins, et al. | 73/514.32 |
| 3,290,786 A | 12/1966 | Parkin | 318/584 |
| 3,417,626 A | 12/1968 | Riordan | 73/514.13 |
| 3,746,281 A | 7/1973 | Stripling | 244/3.2 |
| 4,470,562 A | 9/1984 | Hall et al. | 244/3.2 |
| 4,507,737 A | 3/1985 | LaSarge, et al. | 701/220 |
| 4,583,296 A | 4/1986 | Dell'Acqua | 33/366.12 |
| 4,601,206 A | 7/1986 | Watson | 73/510 |
| 4,792,676 A | 12/1988 | Hojo et al. | 356/622 |
| 4,912,397 A * | 3/1990 | Gale et al. | 324/132 |
| 4,987,779 A * | 1/1991 | McBrien | 73/514.18 |
| 5,008,774 A | 4/1991 | Bullis, et al. | 73/514.13 |
| 5,031,330 A | 7/1991 | Stuart | 33/366.12 |
| 5,079,847 A | 1/1992 | Swartz et al. | 33/366.12 |
| 5,124,938 A | 6/1992 | Algrain | 702/141 |
| 5,146,417 A * | 9/1992 | Watson | 702/85 |
| 5,180,986 A | 1/1993 | Swartz et al. | 324/660 |
| 5,191,713 A | 3/1993 | Alger, et al. | 33/315 |
| 5,283,528 A * | 2/1994 | van Seeters | 324/679 |
| 5,325,065 A | 6/1994 | Bennett et al. | 324/661 |
| 5,383,363 A | 1/1995 | Kulmaczewski | 73/510 |
| 5,415,040 A | 5/1995 | Nottmeyer | 73/514.02 |
| 5,454,266 A | 10/1995 | Chevroulet et al. | 73/514.18 |
| 5,456,111 A * | 10/1995 | Hulsing, II | 73/514.32 |
| 5,461,319 A | 10/1995 | Peters | 324/660 |
| 5,495,414 A | 2/1996 | Spangler et al. | 701/45 |

(Continued)

FOREIGN PATENT DOCUMENTS

EP 585862 A1 3/1994
JP 06082469 A 3/1994

*Primary Examiner*—Hezron Williams
*Assistant Examiner*—Tamiko Bellamy
(74) *Attorney, Agent, or Firm*—Ostrager Chong Flaherty & Broitman

(57) ABSTRACT

A capacitance accelerometer includes a housing, and a plate fixed within the housing. A moveable plate is disposed in substantially parallel relation to the fixed plate and is coupled to the housing along at least an edge. The moveable plate and the fixed plate define a distance. The distance varies in response to acceleration forces acting upon the moveable plate, and wherein the moveable plate and the fixed plate generate a charge displacement capacitance signal. A transimpedance amplifier receives the charge displacement capacitance signal and generates a scaled voltage signal therefrom. An acceleration signal is generated from the scaled voltage signal.

14 Claims, 4 Drawing Sheets

U.S. PATENT DOCUMENTS

| | | | |
|---|---|---|---|
| 5,597,956 A | 1/1997 | Ito et al. | 73/514.18 |
| 5,774,996 A | 7/1998 | Ogawa et al. | 33/366.12 |
| 5,801,309 A | 9/1998 | Carr et al. | 73/514.29 |
| 5,801,313 A * | 9/1998 | Horibata et al. | 73/718 |
| 5,831,164 A | 11/1998 | Reddi et al. | 73/514.01 |
| 5,861,754 A | 1/1999 | Ueno et al. | 324/660 |
| 5,905,203 A | 5/1999 | Flach et al. | 73/514.32 |
| 5,969,250 A | 10/1999 | Greiff | 73/514.38 |
| 5,986,497 A | 11/1999 | Tsugai | 327/554 |
| 6,128,955 A | 10/2000 | Mimura | 73/510 |
| 6,230,566 B1 * | 5/2001 | Lee et al. | 73/514.32 |
| 6,293,148 B1 | 9/2001 | Wang et al. | 73/504.02 |
| 6,338,199 B1 | 1/2002 | Chigira et al. | 33/318 |
| 6,449,857 B1 | 9/2002 | Anikolenko | 33/366.11 |
| 6,467,346 B1 | 10/2002 | Challoner et al. | 73/504.02 |
| 6,609,037 B1 | 8/2003 | Bless et al. | 700/45 |
| 6,622,647 B1 | 9/2003 | DePoy | 114/21.3 |
| 6,662,654 B1 | 12/2003 | Miao et al. | 73/488 |
| 6,688,013 B1 | 2/2004 | Greway | 33/366.21 |
| 6,701,788 B1 | 3/2004 | Babala | 73/649 |
| 6,731,121 B1 | 5/2004 | Hsu et al. | 324/678 |
| 6,776,043 B1 | 8/2004 | Campbell et al. | 73/514.32 |
| 6,785,975 B1 | 9/2004 | Campbell et al. | 33/356 |
| 6,810,739 B1 | 11/2004 | Campbell, et al. | 73/514.01 |
| 2002/0005297 A1 | 1/2002 | Alft, et al. | 175/26 |
| 2002/0190607 A1 | 12/2002 | Padden, et al. | 310/328 |
| 2003/0079543 A1 | 5/2003 | Potter | 73/514.32 |

\* cited by examiner

SINGLE PLATE CAPACITIVE ACCELERATION DERIVATIVE DETECTOR

BACKGROUND OF INVENTION

The present invention relates generally to accelerometer systems, and more particularly, to a single plate capacitive acceleration derivative detector.

It is well known that capacitive accelerometers measure the acceleration, vibration and the inclination of objects to which they are attached. These objects typically include missiles, spacecraft, airplanes and automobiles.

In general, capacitive accelerometers change electrical capacitance in response to acceleration forces and vary the output of an energized circuit. Capacitive accelerometer systems generally include sensing elements, including capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

This type of accelerometer can be used in a missile or in a portion of aircraft or spacecraft navigation or guidance systems. Accordingly, the temperature in the operating environment of the accelerometer changes over a wide range. Consequently, acceleration must be measured with a high accuracy over a wide range of temperatures. This is often a difficult and inefficient process for current accelerometer systems.

The disadvantages associated with current capacitive accelerometer systems have made it apparent that a new capacitive accelerometer is needed. The new accelerometer should substantially minimize temperature sensing requirements and should also improve acceleration detection accuracy. The present invention is directed to these ends.

SUMMARY OF INVENTION

In accordance with one aspect of the present invention, an accelerometer includes a housing, and a plate fixed within the housing. A moveable plate is disposed in substantially parallel relation to the fixed plate and is coupled to the housing along at least an edge. The moveable plate and the fixed plate define a distance. The distance varies in response to acceleration forces acting upon the moveable plate, and wherein the moveable plate and the fixed plate generate a charge displacement capacitance signal. A transimpedance amplifier receives the charge displacement capacitance signal and generates a scaled voltage signal therefrom. An acceleration signal is generated from the scaled voltage signal.

In accordance with another aspect of the present invention, a method for operating a single plate capacitive acceleration derivative detector includes accelerating the moveable plate, thereby causing a distance between the moveable plate and a fixed plate to change; generating a variable capacitor signal; generating a scaled voltage signal in response to the variable capacitor signal; and generating an acceleration signal in response to the scaled voltage signal.

One advantage of the present invention is that it generates a dynamic range of temperature and a granularity sufficient for Inter-Continental Ballistic Missile (ICBM) usage. Additional advantages include that the accelerometer system consumes less power than prior accelerometer systems, while dramatically improving reliability and reduction in manufacturing costs.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

The present invention is illustrated with respect to single plate capacitive acceleration derivative detector, particularly suited to the aerospace field. The present invention is, however, applicable to various other uses that may require acceleration detection, such as any system requiring acceleration detection under extreme conditions, as will be understood by one skilled in the art.

Figure 1:
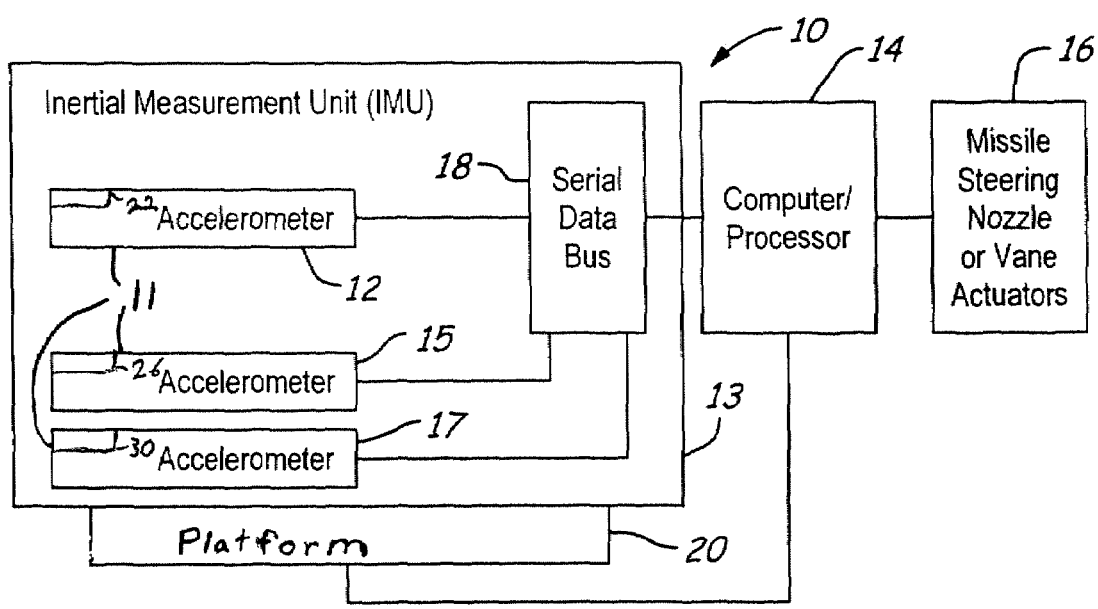
FIG. 1 illustrates an aeronautical system in accordance with one embodiment of the present invention.

Referring to FIG. 1, the missile or aerospace system controlling acceleration 10, including a capacitance acceleration derivative detector system 11 (CADD) within an inertial measurement unit 13, is illustrated. The aerospace system 10 is merely an illustrative example of an accelerating object and not meant to be limiting. For example, the present single plate capacitive acceleration derivative detector system 11 could be implemented in any accelerating object to sense acceleration forces, including any type of vehicle or missile system, such as a Minuteman III missile system or a Scud missile system.

The illustrated aerospace system 10 includes an inertial measurement unit 13 including three accelerometers (first) 12, (second) 15, (third) 17 and a serial data bus 18. The aerospace system 10 further includes a computer/processor 14, a missile steering unit 16, and a platform 20.

The three accelerometers 12, 15, and 17, are coupled to the inertial platform 20 and the serial bus 18, which transfers information to a computer/processor 14 from the accelerometers 12, 15, 17.

Important to note is that alternate embodiments of the present invention have two or more accelerometers, the three illustrated accelerometers 12, 15, 17 are only one example of a possible arrangement of accelerometers for the accelerometer system 11, and any number of accelerometers can be utilized.

In accordance with one embodiment of the present invention, each accelerometer 12, 15, 17 includes at least one transimpedance amplifier, i.e. first 22 for accelerometer 12, second 26 for accelerometer 15, and third 30 for accelerometer 17. Each accelerometer 12, 15, 17 is a single axis accelerometer generating a robust wide dynamic range of performance. The accelerometers 12, 15, 17 will be discussed in further detail in reference to FIGS. 2 and 3.

The platform 20, whereon the accelerometers 12, 15, 17 are mounted, may be a single flat platform 20 or gimbals and gimbal torque motors (yaw, pitch and roll motors) or any other accelerometer or derivative detector mount known in the art.

The processor 14 is coupled to the missile steering nozzle (or vane actuators) unit 16 and the platform 20 and receives signals from the accelerometers 12, 15, 17. The processor 14 will be discussed in detail later.

Figure 2:
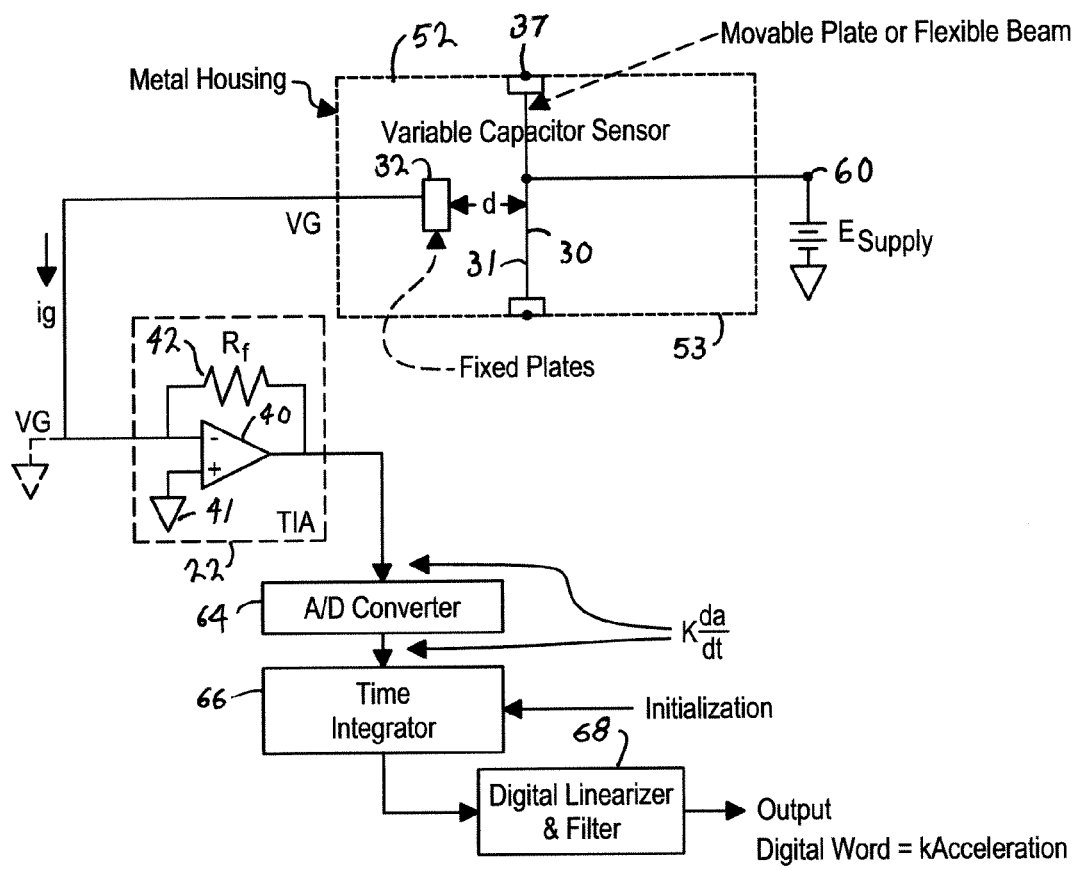
FIG. 2 illustrates a capacitance acceleration derivative detector system in accordance with FIG. 1.
Figure 3:
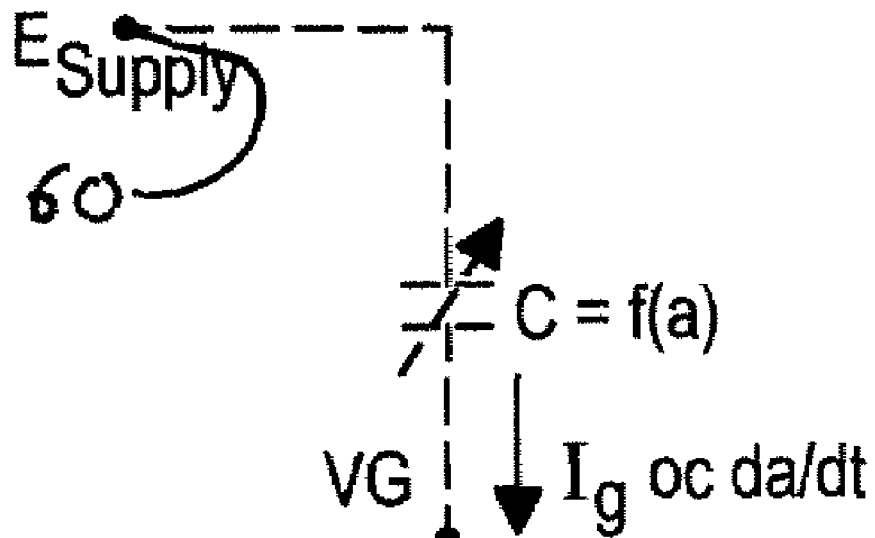
FIG. 3 illustrates an equivalent diagram for the variable capacitance sensor from the capacitance acceleration derivative detector system of FIG. 2.

Referring to FIGS. 2 and 3, an example of a possible configuration for the accelerometer 12 is included as an illustrative example of the accelerometers 12, 15 and 17.

The accelerometer 12 is part of an inertial measurement unit 13 (IMU), as was previously discussed. The accelerometer 12 includes a variable capacitor sensor 52 and a housing 53 for the sensor 52, one transimpedance amplifier 22, a power supply 60, an analog-to-digital converter 64, a time integrator 66, and a digital linearizer and filter 68.

The variable capacitor sensor 52 includes a single moveable plate 30, a fixed plate 32, and a metal housing structure 53. The variable capacitor sensor 52 generates charge displacement capacitance signals in response to acceleration of the aeronautical system 10, as will be discussed later.

The moveable plate 30 may be a flexured diaphragm, a cantilevered beam, a flexible beam, or any object which moves under acceleration with respect to the fixed plate.

The moveable plate 30 is positioned parallel to the fixed plate 32 such that the fixed plate 32 is a distance (d) from a side 31 of the moveable plate 30. The moveable plate 30 is affixed to the metal housing structure 52 through at least a portion of at least one edge 37 of the moveable plate 30.

The moveable plate 30 is rigidly or hingably fixed to the metal housing structure 53 through at least the one plate edge 37 through almost any manner known in the art. Resultantly, all the system flexure or movement is generated within or by the moveable plate 30. This generally increases reliability and robustness of the system 10. This, however, generates a non-linear output from the moveable plate 30, which will be discussed regarding the linear lookup table linearizer 68.

A gas or vacuum environment is enclosed within the sensor 52 through the metal housing structure 53 such that there is no interference with the movement of the moveable plate 30 other than the acceleration of the system 10 along a perpendicular axis. During acceleration, the moveable plate 30 moves or flexes according to the reaction force of Newton's second law of motion, force=mass×acceleration (F=ma), causing the distance between the moveable plate 30 and the fixed plate 32 to vary, thus creating the variable capacitor on one side of the moveable plate 30.

The combination of the fixed plate 32 and the moveable plate 30 forms a plate capacitor. In FIG. 3, the equivalent capacitor for the parallel plate capacitor is illustrated in broken lines as C.

The capacitor is constructed from a single fixed plate and a single moveable plate. The capacitor is excited by a single power supply 60, as indicated in FIG. 2. The return for the power supply 60 is provided by the virtual ground 41 of the transimpedance amplifier 22. At rest, the distance between plates is d.

The capacitance of the plate capacitor is determined by $C \cong (\epsilon_0 A)d$, where $\epsilon_0$ is the permittivity constant, A is the area of a fixed plate 32 (if l is the length of one side and the cross section of the plate is square, then $A=l^2$) and d is the effective distance between the moveable plate 30 and the fixed plate 32.

The fixed plate 32 is coupled to the metal housing structure 53 and positioned a distance (d) from the moveable plate 30. The capacitance of the fixed plate 32 responds to movement of the moveable plate 30 when d either increases or decreases, thereby generating a charge displacement capacitance signal.

The embodied transimpedance amplifier 22 includes components well known in the art. The various components include, but are not limited to, an amplifier 40, a ground 41, and at least one resistor 42. The transimpedance amplifier 22 receives the charge displacement capacitance signal from the fixed plate 32 and generates therefrom a scaled voltage, which is proportional to d.

The transimpedance amplifier 22 is coupled to the fixed plate 32. The transimpedance amplifier 22 is also coupled to A/D converter 64, which is connected to the time integrator 66, which is coupled to the LLT 68, which is coupled to the processor 14 (missile operations processor). The processor 14 is coupled to an actuator 16, and to various system components 11, as well as thrusters and attitude control devices.

The charge q on the capacitor is generated by the equation q=CE, where E is the excitation from source 60 and $C=C_0+ka$, k being a scalar constant and a being the acceleration. As the system 10 accelerates along a sensitive axis (x for accelerometer 12, y for accelerometer 15, and z for accelerometer 17), the voltage on the capacitors is held constant. Under acceleration, the charge changes as the capacitor charges according to dq/dt=E dC/dt where $dq/dt \equiv i_g$, and $i_g$ is the capacitor current into the virtual ground 41 of the transimpedance amplifier 22.

The accelerometer 12 is excited with an DC source 60 at one end and grounded at the other. The ground 41 is a component of the transimpedance amplifier 22.

The accelerometer configuration reduces the temperature sensitivity and the DC excitation allowing narrow band analog filtering, both of which enhance the signal-to-noise ratio. The accelerometer 12 circuitry utilizes high speed CMOS, as the accuracy required for performance will require low propagation delays.

The present configuration reduces the bias error since the instrument is now DC coupled. The circuitry will be a precision design utilizing high speed CMOS, as the accuracy required for performance will require low propagation delays.

The A/D converter 64 receives the capacitor signals and generates therefrom digital values, which are then time integrated in the time integrator 66 to generate acceleration. This output is a digital word whose magnitude is proportional to the acceleration of the system 10 in either direction along the perpendicular axis.

The time integrator 66 performs signal integration in the digital domain after initialization. The sensor output, which is gain adjusted and represents a signal proportional to the time rate of change of acceleration. The voltage polarity generates direct indication of the direction of acceleration.

The compensation for the non-linearity of the flexure structure and overall transport error will be compensated for by a digital corrector within the processor 14 having a value established in manufacturing by taking samples of performance curves.

In the digital linearizer and filter 68, statistical filtering of the data somewhere significantly above the maximum flexure frequency followed by a time integration of the digital signal is generated. This reduces the overall noise impact and the exact performance of this filter 68 is determined during, for example, development. This final output represents the integral ∫da/dt of the acceleration of the moveable plate 30 from the initialization time.

The digital word (time integrator signal) is filtered and linearized in the digital linearizer and filter 68 for manufacturing and flexure non-uniformities. The filter is embodied, for example, as a multi-pole filter reducing noise to the required time domain level. The filter output is a digital word having a magnitude proportional to the acceleration of the system 10 in either direction along the perpendicular axis. The output of the linearizer 68 is an acceleration signal multiplied by a constant (k).

Statistical filtering of the linearized data above the maximum flexure frequency also occurs in either the digital linearizer and filter 68 or the processor 14 to reduce the overall noise impact on the system 10. The compensation for the non-linearity of the flexure structure and overall transport error is compensated for by the linearizer and filter 68 whose values are established in manufacturing through sampling performance curves.

The processor 14 receives the output signals from the accelerometers 12, 15, 17 and generates a derivative detection signal and response thereto. The processor 14 is embodied as a typical missile or airplane processor, as is familiar in the art. The processor 14 may include the analog-to-digital converter 64, the time integrator 66, and the linearizer 68 or any combination thereof. The processor 14 may also be a stand alone component receiving signals from the aforementioned components.

The processor 14 also compensates for the non-linearity of the flexure structure and overall transport error by a digital corrector within the processor 14, such as the linearizer 68, having a value established in manufacturing by taking samples of performance curves.

The actuator, here embodied as missile steering nozzle or vane actuators 16 receives the derivative detection signal and activates system components (e.g. object control devices) in response thereto. System components include for example, thrusters or attitude control devices.

Figure 4:
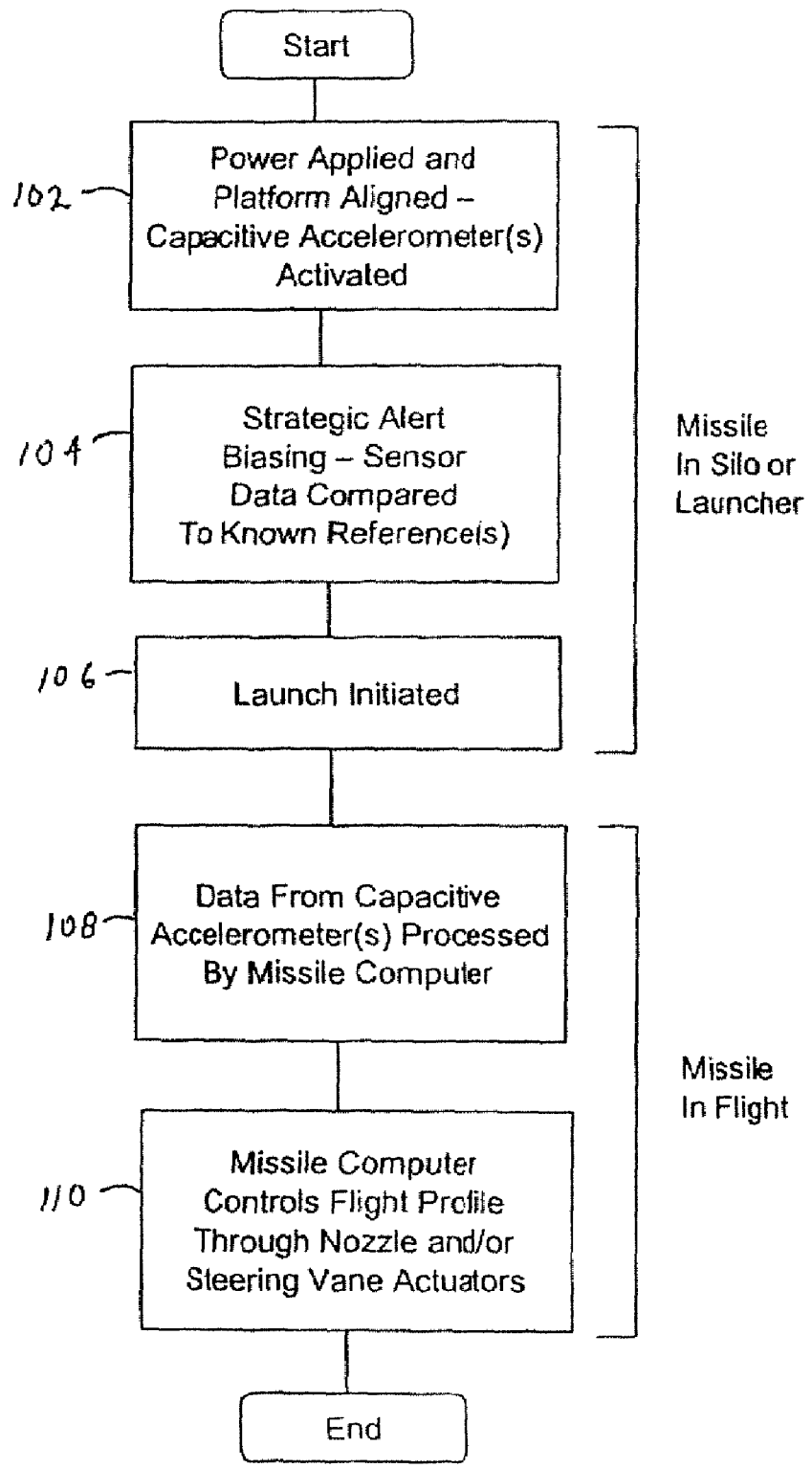
FIG. 4 illustrates a logic flow diagram of the aeronautical system of FIG. 1 in operation, in accordance with another embodiment of the present invention.

Referring to FIG. 4, a logic flow diagram 100 illustrating a method for acceleration control is illustrated. Logic starts in operation block 102 where power is applied to the system and the capacitive accelerometer 12, 15, or 17 is activated.

In operation block 104, strategic alert biasing occurs and sensor data is compared to a known reference.

In operation block 106, the missile system 10 is launched.

In operation block 108, the missile system 10 accelerates and the moveable plate flexes to either increase or decrease d for any of the three accelerometers 12, 15, or 17. The transimpedance amplifier 22 activates and receives signals from the fixed plate capacitor, which are generated in response to a change in d. The transimpedance amplifier 22 then generates scaled voltage signals in response to the fixed plate capacitor signals.

In operation block 108, the overall frequency signal, i.e. the results of the acceleration, are time integrated in the time integrator 66, thereby generating an initialized time integrated signal. The time integrated signal is then linearized. This linearization is achieved through a linear lookup table (linearizer 68), or other linearization methods known in the art. Data from the accelerometer(s) is processed by the missile processor 14 or attitude controller.

In operation, a method for operating a moveable plate capacitance accelerometer system includes accelerating the moveable plate, thereby causing a distance between the moveable plate and a fixed plate to change; generating a variable capacitor signal; generating a scaled voltage signal in response to the variable capacitor signal; and generating an acceleration signal in response to the scaled voltage signal.

This process is typically engaged when a missile is at rest, prior to launch, or in flight.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration control. Numerous and other arrangements would be evident to those skilled in the art without departing from the scope of the invention as defined by the following claims.

The invention claimed is:

1. A single plate capacitive acceleration derivative detector comprising:
   a housing;
   a plate fixed within said housing;
   a moveable plate disposed in substantially parallel relation to said fixed plate, said moveable plate coupled to said housing along at least an edge, said moveable plate and said fixed plate defining a distance,
   wherein said distance varies in response to acceleration forces acting upon said moveable plate, and wherein said moveable plate and said fixed plate generate a charge displacement capacitance signal as a function of a signal from a power source in series with said moveable plate and said fixed plate and as a function of said distance;
   a transimpedance amplifier receiving said charge displacement capacitance signal and generating a scaled voltage signal therefrom, wherein an acceleration signal is generated from said scaled voltage signal;
   an analog-to-digital converter receiving said scaled voltage signal and generating a digital voltage signal therefrom; and
   a time integrator integrating said digital voltage signal in response to initialization parameters and generating an integrated signal therefrom, whereby voltage polarity of said digital voltage signal provides direct indication of a direction of acceleration.

2. The system of claim 1 further comprising a linearizer receiving said integrated signal and generating therefrom a linearized acceleration signal.

3. The system of claim 2 wherein said linearizer comprises a linear lookup table.

4. The system of claim 2 further comprising an actuator activating a system component in response to a system control signal; and a processor receiving said linearized acceleration signal and generating said system control signal in response thereto.

5. The system of claim 1 wherein said moveable plate comprises a flexured diaphragm, a cantilevered beam, a flexible beam, or any object which moves under acceleration with respect to said fixed plate.

6. A method for operating a single plate capacitive acceleration derivative detector system having a single moveable plate and a single fixed plate comprising;
   accelerating the single moveable plate, thereby causing a distance between the single moveable plate and the single fixed plate to change;
   generating a variable capacitor signal;

generating a scaled voltage signal in response to said variable capacitor signal; and generating an acceleration signal in response to said scaled voltage signal, wherein generating said acceleration signal further comprises generating a digital voltage signal, wherein generating said acceleration signal further comprises generating an integrated voltage signal in response to initialization parameters and integrating said digital voltage signal, whereby voltage polarity of said digital voltage signal provides direct indication of a direction of acceleration.

7. The method of claim 6, wherein generating said acceleration signal further comprises linearizing said integrated voltage signal and generating a linearized signal therefrom.

8. The method of claim 7, wherein generating said acceleration signal further comprises filtering said linearized signal and generating said acceleration signal therefrom.

9. The method of claim 8 further comprising activating an object control device in response to said acceleration signal.

10. A system for controlling acceleration including an object adapted to accelerate comprising:
a platform;
a first accelerometer coupled to said platform and comprising a first variable capacitor sensor comprising a housing, a flexured diaphragm, comprising a side and an edge, said edge coupled to said housing structure,
a fixed plate coupled to said housing at a distance from said side of said flexured diaphragm,
said flexured diaphragm being flexible under acceleration forces wherein said distance varies as a function of said acceleration forces to generate a charge displacement capacitance signal in response to change in said distance;
a transimpedance amplifier receiving said charge displacement capacitance signal and generating a time-varying voltage signal in response thereto;
an analog-to-digital converter receiving said time-varying voltage signal and generating a digital voltage signal therefrom;
a time integrator integrating said digital voltage signal in response to initialization parameters and generating an integrated signal therefrom whereby voltage polarity of said digital voltage signal provides direct indication of acceleration;
a linearizer receiving said integrated signal and generating therefrom a linearized acceleration signal; and
a processor coupled to said first accelerometer receiving said linearized acceleration signal and generating a system control signal in response thereto.

11. The system of claim 10 further comprising an object control device activating in response to said system control signal, said object control device comprising at least one of a thruster, an attitude control device, a missile steering nozzle, or a vane actuator.

12. The system of claim 10 further comprising a second accelerometer coupled to said platform orthogonal to said first accelerometer, said second accelerometer generating a second accelerometer signal in response to movement of the system, wherein said processor further generates said system control signal in response to said second accelerometer signal.

13. The system of claim 12 further comprising a third accelerometer, wherein said second and third accelerometers are arranged with said first accelerometer to receive cross axis thrust data, wherein said processor generates said system control signal in response to said cross axis thrust data.

14. The system of claim 13 further comprising a serial data bus receiving acceleration signals from said first, second and third accelerometers, said serial data bus exchanging information with said processor.

* * * * *